May 12, 1925.
C. C. DOUGLAS
1,537,808
ILLUMINATED LICENSE PLATE
Filed Feb. 12, 1923
2 Sheets-Sheet 1
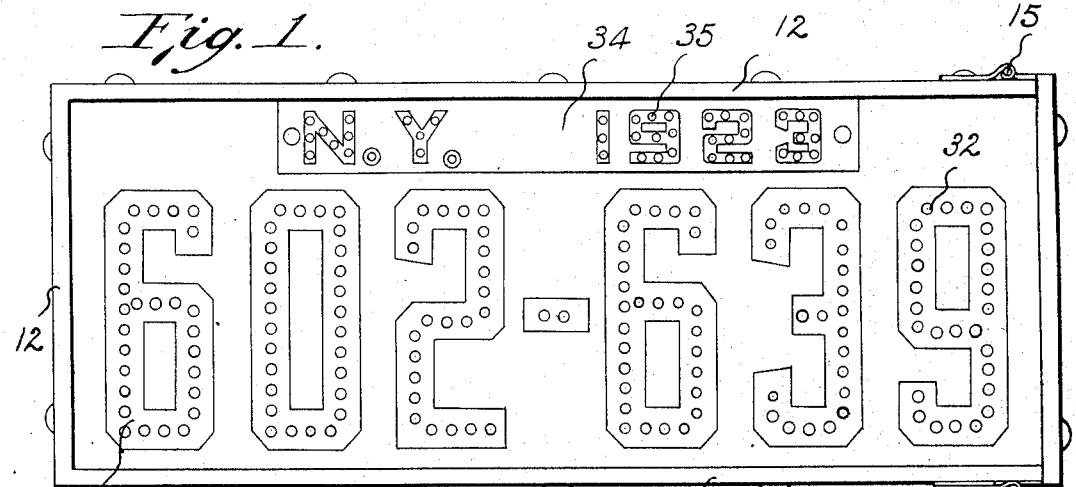
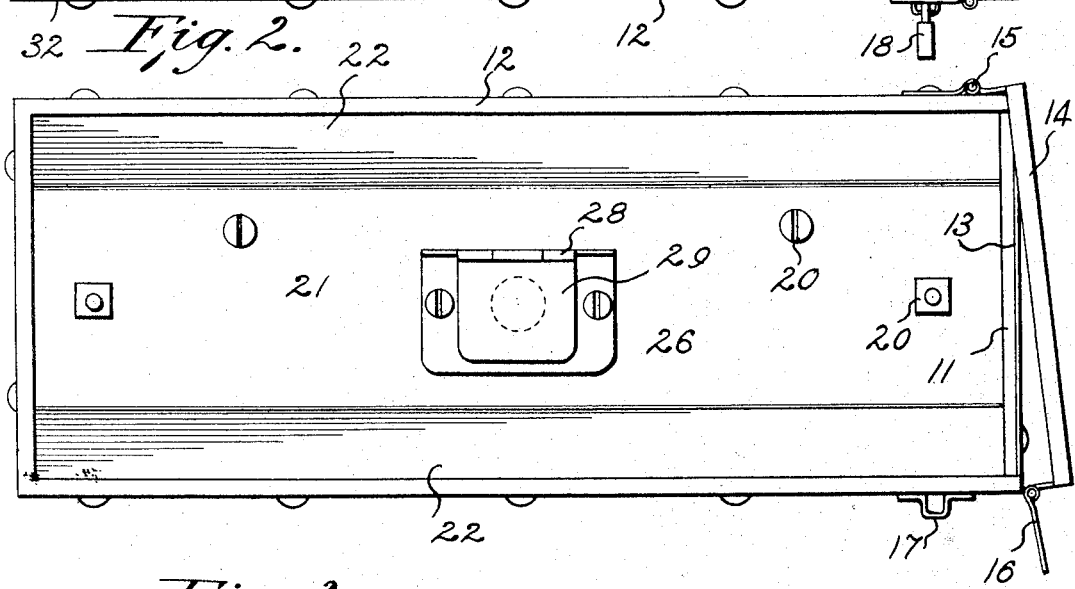
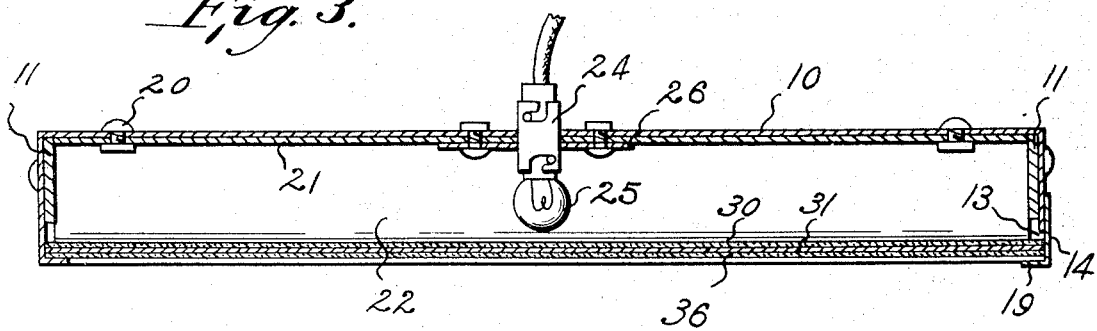
Clayton C. Douglas
INVENTOR
BY Victor J. Evans
ATTORNEY
WITNESS:

May 12, 1925.  1,537,808
C. C. DOUGLAS
ILLUMINATED LICENSE PLATE
Filed Feb. 12, 1923  2 Sheets-Sheet 2
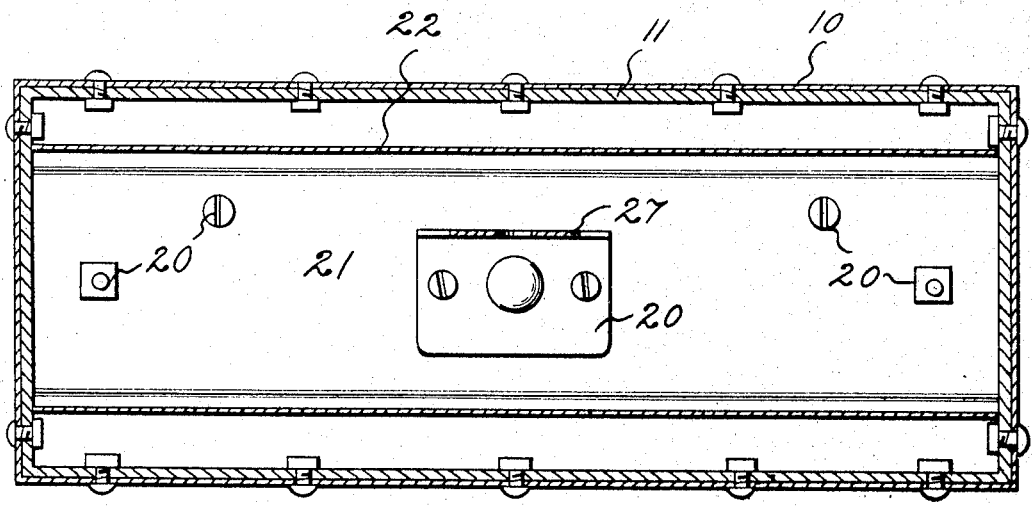
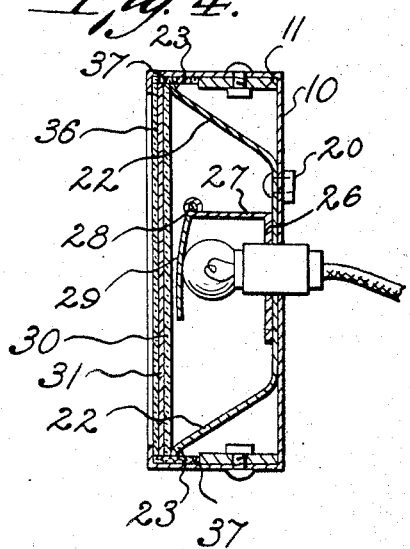
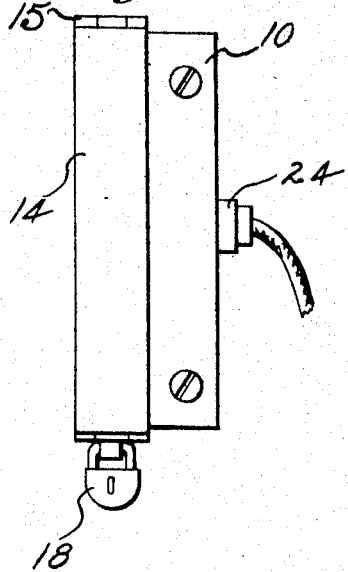
Clayton C. Douglas
INVENTOR
BY Victor J. Evans
ATTORNEY Patented May 12, 1925.

1,537,808

UNITED STATES PATENT OFFICE.

CLAYTON C. DOUGLAS, OF FELTS MILLS, NEW YORK.

ILLUMINATED LICENSE PLATE.

Application filed February 12, 1923. Serial No. 618,562.

*To all whom it may concern:*

Be it known that I, CLAYTON CHARLES DOUGLAS, a citizen of the United States, residing at Felts Mills, in the county of Jefferson and State of New York, have invented new and useful Improvements in Illuminated License Plates, of which the following is a specification.

This invention relates to license plates for motor vehicles and has for its object the provision of a license plate and illuminating means therefor whereby the plate may be visible just as easily at night as by day.

It is well known that under the present system in which use is made of a solid license plate positioned adjacent a tail lamp which throws a white light upon the plate, it is practically impossible to distinguish the numbers on the license plate at any appreciable distance, twenty or twenty-five feet being generally the maximum distance under the most favorable conditions. On account of this fact it frequently occurs that an accident happens and the motorist gets away before the numbers on his license plate can be read. This is manifestly an injustice. Another thing is that the ordinary tail light is not distinguished from the red lights used along a road to indicate the presence of obstructions, excavations and the like. This also causes a great deal of confusion and frequently results in accidents.

It is with the above facts in view that I have designed the present license plate, holder and illuminating means which will render the plate absolutely visible at all times and which will be capable of replacing the ordinary tail light.

Another object is the provision of a license plate constructed in the usual manner but having the various numerals formed with series of perforations which of course follow the outlines of the numerals and through which shines a light which initially passes through a translucent or transparent plate of a color corresponding to the color of the numerals on the plate, or corresponding to the color of the plate itself, depending upon which may be considered more advisable.

Another object is the provision of a novel arrangement of plate by means of which the year, number and State may be changed in case a system be adopted in which a car would be permanently assigned a certain number to be good during the life of the car.

An additional object is the provision of a holder and illuminating means which will be simple and inexpensive in manufacture, efficient and durable in use and a general improvement in the art.

With the above and other objects and advantages in view the invention consists in the details of construction to be hereinafter more fully described and claimed and illustrated in the accompanying drawings, in which:

Figure 1 is a front elevation showing my complete device,

Figure 2 is an elevation with the clear glass, license plate and translucent sheet or pane removed, Figure 3 is a horizontal section taken longitudinally through the device, Figure 4 is a vertical cross section, Figure 5 is a vertical longitudinal section showing the frame construction, Figure 6 is an end view.

Referring more particularly to the drawings I have shown my holder as comprising an elongated rectangular box or casing 10 reinforced internally by a rectangular metal frame 11 riveted or otherwise secured to the casing. The front of the casing is open and the edges of the top and bottom and one end are formed with overhanging flanges 12. One end is partly cut away to define an opening 13 which is ordinarily closed by a door 14 hingedly mounted at 15 and carrying a hasp 16 engaging over a staple 17 which is designed to receive a pad lock 18 or the like for holding the door locked against tampering. The door 14 has one edge formed with an overhanging flange 19 corresponding to the flanges 12.

Suitably secured against the back wall of the casing as by means of rivets or bolts 20 is an elongated reflector 21 preferably coextensive in length with the casing and with the cross sectional configuration shown so as to have divergent upper and lower wings 22 which are resilient and which have their edges rolled or turned as indicated at 23.

The numeral 24 represents an ordinary socket which extends through the back of the casing and through the reflector and which is secured in place by any suitable means. This socket 10 what is commonly called the Ediswan type such as is used commonly in the illuminating systems of automobiles and the socket contains or holds an ordinary bulb 25. Mounted on the reflector adjacent the socket is a plate 26 of angular formation which includes an attaching portion secured to the reflector and a horizontal portion 27 upon the free edge of which is hinged at 28 a small reflector plate 29 which overlies the bulb for the purpose of reflecting the light from the bulb on to the main reflector 21.

Engaged within the casing and resting upon the rolled edges 23 of the reflector wings is a transparent or translucent sheet or panes 30 of glass or celluloid colored as may be necessary to agree with either the back ground or the numerals of the license plate for the particular State in which the device is used and for which the license plate is issued.

Engaged upon the top or outside of this pane or sheet 30 is the license plate 31 which is formed of metal in the usual manner, enameled and having the pressed out or otherwise formed numerals thereon. This plate is provided within the confines of each numeral thereon with a series of perforations 32 which form an outline identical with the numerals so as to display the same number when a light is placed back of the plate. If desired the plate may be provided with a cut out portion 33 over which is detachably secured an auxiliary plate 34 bearing the abbreviation or name of the State for which the license is issued and also bearing the year number. These legends are likewise formed with a series of perforations 35 so that the light may shine through them.

Covering the license plate 31 is a pane or sheet 36 of clear glass which is retained in place by the flanges 12 and 19. Owing to the resilience of the reflector wings 22 it will be apparent that the three plates will be resiliently urged into close engagement with the retaining flanges so that any rattling will be prevented. The inner faces of the casing and the door are covered with strips of felt 37 against which the edges of the various plates engage and this felt forms a cushion which likewise prevents rattling of the plates and which makes a tight joint which will exclude dirt and water.

In the use of the device it will be apparent that when the bulb 25 is energized the light will be reflected by the auxiliary reflector 29 onto the main reflector 21 and will pass through the transparent or translucent pane or sheet 30 and through the perforations 32 and 35 in the license plate, so that the legends thereon will be clearly visible to as great a distance as in the day time. It is also to be noted that the ordinary tail light will be unnecessary when my device is used as the illuminated license plate is ample for all purposes.

From the foregoing description and a study of the drawings it will be apparent that I have thus provided a simply constructed, consequently inexpensive license plate, holder and illuminating means which will be very efficient for the purpose specified and which will be a great safeguard to the public.

While I have shown and described the preferred embodiment of the invention it is of course to be understood that I reserve the right to make such changes in the form, construction and arrangement of parts as will not depart from the spirit of the invention or the scope of the subjoined claim.

I claim:

In a device of the character described, a casing, plates mounted therein, a reflector, a socket extending through the reflector and carrying an incandescent bulb, and an auxiliary reflector formed as an angular plate member secured upon the center of the main reflector and having a depending leaf hinged upon its free edge for extending downwardly below and outwardly of the bulb for throwing the light from the bulb back onto the main reflector.

In testimony whereof I affix my signature.

CLAYTON C. DOUGLAS.